United States Patent
Tokiwa

(10) Patent No.: US 10,766,166 B2
(45) Date of Patent: *Sep. 8, 2020

(54) METHOD FOR PRODUCING SKIN-COVERED, EXPANDED BEAD MOLDED ARTICLE

(71) Applicant: JSP CORPORATION, Tokyo (JP)

(72) Inventor: Tomoo Tokiwa, Kanuma (JP)

(73) Assignee: JSP CORPORATION, Tokyo (JP)

( * ) Notice: Subject to any disclaimer, the term of this patent is extended or adjusted under 35 U.S.C. 154(b) by 511 days.

This patent is subject to a terminal disclaimer.

(21) Appl. No.: 14/792,763

(22) Filed: Jul. 7, 2015

(65) Prior Publication Data

US 2016/0017108 A1 Jan. 21, 2016

(30) Foreign Application Priority Data

Jul. 18, 2014 (JP) .................................. 2014-147673
Jun. 17, 2015 (JP) .................................. 2015-121841

(51) Int. Cl.
*B29C 44/44* (2006.01)
*B29B 11/14* (2006.01)
(Continued)

(52) U.S. Cl.
CPC .............. *B29B 11/14* (2013.01); *B29C 44/14* (2013.01); *B29C 44/343* (2013.01); *B29C 44/3461* (2013.01); *C08J 9/122* (2013.01); *C08J 9/18* (2013.01); *C08J 9/232* (2013.01); *B29C 44/445* (2013.01); *B29C 48/0017* (2019.02); *B29C 48/05* (2019.02); *B29C 48/08* (2019.02); *B29C 48/30* (2019.02); *B29C 48/345* (2019.02); *B29C 51/02* (2013.01); *B29K 2023/12* (2013.01); *B29K 2105/04* (2013.01); *B29K 2105/043* (2013.01);
(Continued)

(58) Field of Classification Search
CPC .................................................... B29C 44/445
See application file for complete search history.

(56) References Cited

U.S. PATENT DOCUMENTS

2004/0256757 A1* 12/2004 Sasaki ...................... C08J 9/18
 264/51
2006/0116434 A1 6/2006 Sasaki et al.
(Continued)

FOREIGN PATENT DOCUMENTS

CN 1612913 A 5/2005
CN 101061163 A 10/2007
(Continued)

OTHER PUBLICATIONS

Eung Kee Lee, Novel Manufacturing Processes for Polymer Bead Foams, University of Toronto 2010 (Year: 2010).*
(Continued)

*Primary Examiner* — Matthew J Daniels
*Assistant Examiner* — Patrick Butler
(74) *Attorney, Agent, or Firm* — Bacon & Thomas, PLLC

(57) ABSTRACT

A method for producing a skin-covered molded article including filling polypropylene-based resin expanded beads in a hollow space of a thermoplastic resin skin and feeding steam into the hollow space to fusion-bond the expanded beads together, the expanded beads showing specific DSC characteristics involving a specific high temperature peak(s) with specific heat of fusion.

8 Claims, 3 Drawing Sheets

(51) Int. Cl.
- *B29C 44/34* (2006.01)
- *B29C 44/14* (2006.01)
- *C08J 9/12* (2006.01)
- *C08J 9/18* (2006.01)
- *C08J 9/232* (2006.01)
- *B29K 23/00* (2006.01)
- *B29K 105/04* (2006.01)
- *B29L 9/00* (2006.01)
- *B29C 51/02* (2006.01)
- *B29C 48/08* (2019.01)
- *B29C 48/345* (2019.01)
- *B29C 48/30* (2019.01)
- *B29C 48/05* (2019.01)
- *B29C 48/00* (2019.01)

(52) U.S. Cl.
CPC .......... *B29K 2105/048* (2013.01); *B29K 2995/0063* (2013.01); *B29L 2009/00* (2013.01); *C08J 2203/06* (2013.01); *C08J 2323/14* (2013.01)

(56) References Cited

U.S. PATENT DOCUMENTS

| | | |
|---|---|---|
| 2008/0039588 A1 | 2/2008 | Shibata et al. |
| 2008/0275148 A1* | 11/2008 | Tokiwa .................. B29C 44/14 521/51 |
| 2009/0156700 A1 | 6/2009 | Oikawa et al. |
| 2014/0110491 A1* | 4/2014 | Roberts, Jr. ............. B29C 49/04 238/84 |

FOREIGN PATENT DOCUMENTS

| | | |
|---|---|---|
| CN | 101691433 A | 4/2010 |
| JP | 2000-210967 A | 8/2000 |
| JP | 2003201361 A | 7/2003 |
| JP | 2004-249558 A | 9/2004 |

OTHER PUBLICATIONS

Chinese search report in related Chinese application 201510422236.9 dated May 21, 2018.

* cited by examiner

METHOD FOR PRODUCING SKIN-COVERED, EXPANDED BEAD MOLDED ARTICLE

BACKGROUND OF THE INVENTION

Field of the Invention

This invention relates to a process for producing a skin-covered, expanded bead molded article and, more specifically, to a process for producing a skin-covered, expanded bead molded article by heating polypropylene-based resin expanded beads, filled in a hollow space of a thermoplastic resin skin, to fusion-bond them together.

Description of Prior Art

A skin-covered, expanded bead molded article composed of an expanded bead molded article and a skin (hollow molded article) that covers the expanded bead molded article is known. Such a skin-covered, expanded bead molded article may be produced by a method in which a skin is first formed by blow molding from a parison. The hollow space of the skin in a softened state is subsequently filled with expanded beads. The expanded beads are then heated with steam, supplied through steam pins inserted through the skin, and fusion-bonded together to give the intended skin-covered, expanded bead molded article. The steam pins are adapted for feeding and discharging steam therethrough.

Production of a skin-covered, expanded bead molded article encounters a problem because it is not easy to heat the expanded beads with a heating medium such as steam. Skin-free, expanded bead molded articles may be produced without difficulty by supplying a large amount of steam into a mold cavity, filled with expanded beads, through a large number of slits provided in nearly the whole area of the wall of the mold. In the case of skin-covered, expanded bead molded articles, on the other hand, it is necessary to insert steam pins through the skin within which expanded beads are to be placed. Since traces of steam pin insertion holes remaining in the skin adversely affect the mechanical strength and appearance of the molded articles, however, an increase of the number of the steam pins should be avoided. Thus, it is not easy to distribute the steam flows throughout the hollow space of the skin and to uniformly heat the expanded beads contained therein. In particular, since those expanded beads located far from the steam pins fail to sufficiently fusion-bond to each other, the obtained skin-covered, expanded bead molded article causes local variation in the fusion-bonding strength. When the pressure of the steam is increased so as to allow the steam to reach every part of the expanded beads, those expanded beads located near the steam pins excessively secondarily expand so that the steam is prevented from passing through such locations and, therefore, from flowing throughout the hollow space of the skin. Again, those expanded beads which are not brought into contact with sufficient steam cause insufficient fusion-bonding. The foregoing problems are especially significantly caused in the production of large-sized skin-covered, expanded bead molded articles.

To cope with the above problems, Japanese Kokai Publication No. JP-A-2000-210967 proposes the use of tubular expanded beads each having a through-hole for the production of a skin-covered, expanded bead molded article and describes that, because of the through-holes, steam can flow throughout the hollow space of the skin in which expanded beads are filled. Japanese Kokai Publication No. JP-A-2004-249558 proposes the use of two-layered expanded beads each composed of an expanded core layer that is covered with a cover layer having a melting point lower than that of the core layer for the production of a skin-covered, polypropylene-based resin expanded bead molded article and describes that, because of the low melting point cover layers, steam having a relatively lower vapor pressure can be used for fusion-bonding the expanded beads to each other and also fusion-bonding the expanded beads to the inner wall of the skin at their contact areas.

SUMMARY OF THE INVENTION

The above prior art techniques which enable to produce skin-covered, expanded bead molded articles require the use of expanded beads having specific shapes or specific layer structures. It has been found that polypropylene-based resin expanded beads having a specific crystal structure can give a skin-covered, expanded bead molded article showing excellent fusion-bonding between expanded beads, even when the expanded beads do not have through-holes or a multi-layer structure. The present invention is based on this finding.

In accordance with one aspect of the present invention, there is provided:

[1] A method for producing a skin-covered, expanded bead molded article comprising the steps of:

providing a skin of a thermoplastic resin molded article defining a hollow space therewithin;

filling polypropylene-based resin expanded beads in the hollow space; and then feeding a heating medium into the hollow space through one or more heating medium feeding pins inserted into the hollow space to fusion-bond the expanded beads to each other and to form an expanded bead molded article that is covered with the skin;

wherein the polypropylene-based resin expanded beads are prepared from a polypropylene-based resin having a melting point of 140 to 155° C., wherein the polypropylene-based resin expanded beads have such a crystal structure that gives a DSC curve when a measurement specimen sampled from the polypropylene-based resin expanded beads is heated from 23° C. to 200° C. at a heating speed of 10° C./min, said DSC curve having an intrinsic endothermic peak intrinsic to the polypropylene-based resin constituting the polypropylene-based resin expanded beads and at least one high temperature endothermic peak which is located on a higher temperature side of the intrinsic endothermic peak, wherein a total heat of fusion $\Delta Ht$ of the entire endothermic peaks of the DSC curve is more than 75 J/g, a ratio $\Delta H2/\Delta Ht$ of a total heat of fusion $\Delta H2$ of said at least one high temperature endothermic peak to the total heat of fusion $\Delta Ht$ is 0.20 to 0.30, and a heat of fusion of that portion of said at least one high temperature endothermic peak which is higher than the peak top temperature of a lowest temperature peak is 6 J/g or more, said lowest temperature peak being that high temperature endothermic peak which has the lowest peak top temperature among the peak top temperatures of said at least one high temperature endothermic peak.

In another aspect, the present invention provides:

[2] The method according to above [1], wherein the thermoplastic resin molded article is obtained by blow molding and wherein the polypropylene-based resin expanded beads are filled in the hollow space of the thermoplastic resin molded article while the thermoplastic resin molded article is in a softened state.

The present invention also provides:

[3] The method according to above [1] or [2], wherein the polypropylene-based resin expanded beads have a bulk density of 20 to 60 kg/m$^3$.

The present invention further provides:

[4] The method according to any one of above [1] to [3], wherein the thermoplastic resin molded article is formed of a polypropylene-based resin.

Since polypropylene-based resin expanded beads have specific crystal structures, the method according to the present invention permits production of a skin-covered, expanded bead molded article having excellent fusion-bonding between the expanded beads.

BRIEF DESCRIPTION OF THE DRAWINGS

Other objects, features and advantages of the invention will become apparent from the detailed description of the invention which follows, when considered in the light of the accompanying drawings, in which.

DETAILED DESCRIPTION OF THE PREFERRED EMBODIMENTS OF THE INVENTION

Figure 1A:
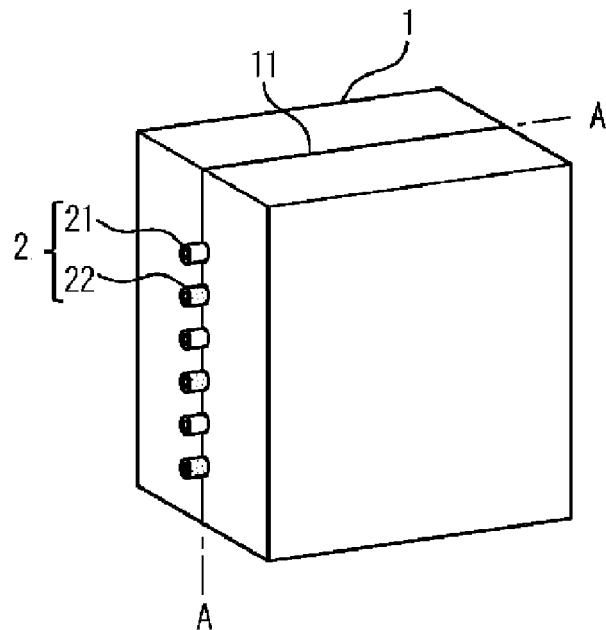
FIG. 1(a) is a perspective view schematically illustrating one embodiment of steam pin arrangement relative to mold halves that are brought together.
Figure 1B:
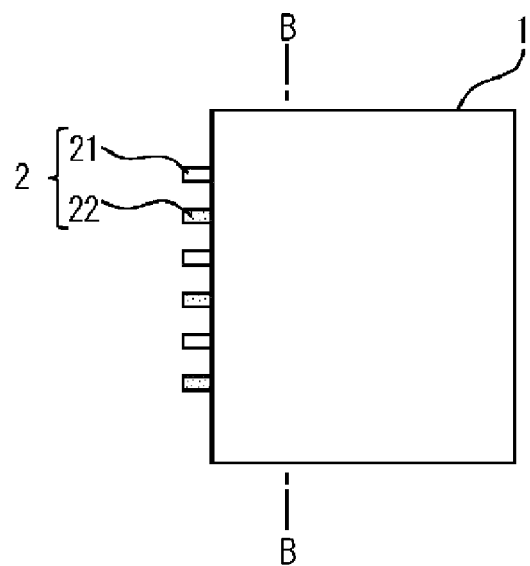
FIG. 1(b) is a front elevational view of FIG. 1(a)
Figure 1C:
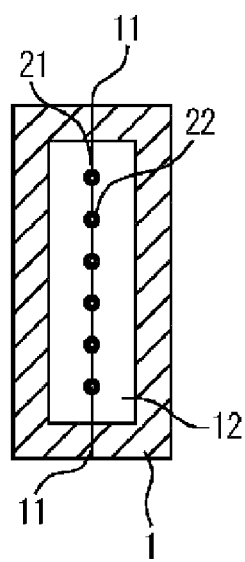
FIG. 1(c) is a sectional view taken along the line B-B in FIG. 1(b)

The present invention relates to a method for producing a skin-covered, expanded bead molded article. In this method, a thermoplastic resin molded article (hereinafter occasionally referred to as "skin") defining a hollow interior space therein is first prepared. Polypropylene-based resin expanded beads (hereinafter occasionally referred to as "PP beads") are then filled in the hollow space. Thereafter, a heating medium such as steam is fed into the hollow space through one or more heating medium feeding pins inserted into the hollow space to heat and fusion-bond the PP beads to each other, thereby forming an expanded bead molded article that is covered with the skin.

The skin-covered, expanded bead molded article may be produced by first preparing a skin defining a hollow space therein using any suitable molding, preferably by blow molding. In the case of the blow molding, a parison is first formed by extrusion and is blow molded between molds to form the skin. The PP beads are then filled in the hollow space of the skin and heated to fusion-bond the PP beads together to obtain an expanded bead molded article covered with the skin. Blow molding is preferred because the formation of the skin and the production of the skin-covered, expanded bead molded article may be efficiently continuously carried out. The skin is generally in a non-foamed state.

As the thermoplastic resin for forming the skin, there may be mentioned, for example, a polystyrene-based resin, a polyethylene-based resin, a polypropylene-based resin, an acrylic-based resin and a polycarbonate-based resin.

Examples of the polyethylene-based resin include low density polyethylene, high density polyethylene, linear low density polyethylene, very low density polyethylene, ethylene-vinyl acetate copolymer, ethylene-methyl methacrylate copolymer, ethylene-methacrylic acid copolymer, and ionomers obtained by inter-molecular cross-linking of the above copolymer with metal ions, and mixtures of two or more thereof. The polypropylene-based resin is preferably a resin containing 50% by weight or more of propylene component units and may be propylene homopolymers and propylene copolymers. Examples of the preferred propylene copolymer include copolymers of propylene and other olefin (ethylene and/or an α-olefin having 4 or more carbons) such as ethylene-propylene copolymer, propylene-butene copolymer and propylene-ethylene-butene copolymer; propylene acrylic acid copolymer; and propylene maleic anhydride copolymer. The copolymers may be block copolymers, random copolymers or graft copolymers. These polypropylene-based resins may be used singly or in combination of two or more.

When it is desired that the skin-covered, expanded bead molded article has excellent fusion-bonding strength between the skin and the expanded bead molded article, a polypropylene-based resin is preferably used as the thermoplastic resin for forming the skin since the skin becomes highly compatible with the PP beads which constitute the expanded bead molded article. When the skin-covered, expanded bead molded article is desired to have excellent impact resistance, high density polyethylene or propylene-ethylene block copolymer is preferably used as the thermoplastic resin for forming the skin.

It is important that the PP beads have such a crystal structure that gives a DSC curve having the characteristics (a)-(d) shown below, when a measurement specimen sampled from the PP beads is heated from 23° C. to 200° C. at a heating speed of 10° C./min by a differential scanning calorimeter.

(a) The DSC curve has an intrinsic endothermic peak intrinsic to the polypropylene-based resin constituting the PP beads and at least one high temperature endothermic peak which is located on a higher temperature side of the intrinsic endothermic peak;

(b) In the DSC curve, a total heat of fusion $\Delta Ht$ of the entire endothermic peaks is more than 75 J/g;

(c) A ratio $\Delta H2/\Delta Ht$ of a total heat of fusion $\Delta H2$ of the at least one high temperature endothermic peak to the total heat of fusion $\Delta Ht$ is 0.20 to 0.30; and (d) A heat of fusion $\Delta Hh$ of that portion of the at least one high temperature peak which is higher than the peak top temperature of a lowest temperature peak is 6 J/g or more, wherein the lowest temperature peak is that high temperature endothermic peak which has the lowest peak top temperature among the peak top temperatures of the at least one high temperature endothermic peak.

The PP beads having the above crystal structure are prevented from excessively secondarily expanding even when they are heated with high pressure steam. Therefore, when the PP beads filled in a hollow space of a skin are heated with steam supplied from steam pins inserted into the skin, those PP beads located near the steam pins do not excessively secondarily expand. Therefore, the steam is not prevented from passing through such locations and is able to flow every part of the hollow space of the skin. Thus, the PP beads can be fusion-bonded to each other uniformly throughout the hollow space of the skin. It follows that the obtained skin-covered, expanded bead molded article shows a high fusion-bonding rate between the PP beads of the whole expanded bead molded article.

The PP beads have such a crystal structure that gives a DSC curve as described below when a measurement specimen sampled from the PP beads is heated from 23° C. to 200° C. at a heating speed of 10° C./min. Namely, the DSC curve should show an intrinsic endothermic peak intrinsic to the polypropylene-based resin constituting the PP beads and at least one high temperature endothermic peak which is located on a higher temperature side of the intrinsic endothermic peak. The term "at least one high temperature endothermic peak" is hereinafter occasionally referred to as "high temperature peak(s)". The specific crystal structure which gives the high temperature peak(s) may be formed by a method in which, after a part of or whole of the crystals inherent to the polypropylene-based resin have been melted, at least a part of the melted crystals are again crystallized at a temperature near the melting point of the crystals. Incidentally, the number of the intrinsic endothermic peak of the PP beads used in the present invention is not limited to only one but may be two or more.

In the DSC curve, a total heat of fusion $\Delta Ht$ of the entire endothermic peaks should be more than 75 J/g. If the total heat of fusion $\Delta Ht$ is excessively low, it is not possible to suppress excessive secondary expansion of the PP beads during heating with steam, even when the PP beads have a high temperature endothermic peak(s). From this point of view, the total heat of fusion $\Delta Ht$ is preferably 78 J/g or more, more preferably 80 J/g or more, particularly preferably 85 J/g or more. The upper limit of total heat of fusion $\Delta Ht$ is generally about 120 J/g.

In the above-described DSC curve, a ratio $\Delta H2/\Delta Ht$ of a total heat of fusion $\Delta H2$ of the high temperature peak(s) to the total heat of fusion $\Delta Ht$ should be 0.20 to 0.30. When the $\Delta H2/\Delta Ht$ ratio is excessively small, the PP beads show excessively high secondary expansion speed when heated with steam. As a result, the PP beads located adjacent to the steam pins undergo excessive expansion so that interstices or gaps between the PP beads disappear. Thus, the steam fails to reach every part of the PP beads within the skin to cause a reduction of the rate of fusion bonding between the PP beads. When the $\Delta H2/\Delta Ht$ ratio is excessively large, on the other hand, the secondary expansion of the PP beads becomes insufficient so that the fusion bonding between the PP beads is reduced. From the above point of view, the lower limit of the $\Delta H2/\Delta Ht$ ratio is preferably 0.21. The upper limit of the $\Delta H2/\Delta Ht$ ratio is preferably 0.28.

In the above-described DSC curve, the heat of fusion $\Delta Hh$ of that portion of the high temperature peak(s) which is higher than the peak top temperature of a lowest temperature peak is 6 J/g or more. The lowest temperature peak herein is that high temperature endothermic peak which has the lowest peak top temperature among the peak top temperatures of the high temperature peak(s). If there is only one high temperature endothermic peak in the obtained DSC curve, this peak is the "lowest temperature peak". The "heat of fusion $\Delta Hh$ of that portion of the high temperature peak(s) which is higher than the peak top temperature of a lowest temperature peak" is hereinafter occasionally referred to as "heat of fusion $\Delta Hh$ of the specific portion of the high temperature peak(s)" or simply as "heat of fusion $\Delta Hh$". When the heat of fusion $\Delta Hh$ is excessively low, the PP beads will melt during steam heating to cause an increase of the shrinkage of the obtained expanded bead molded article. The upper limit of the heat of fusion $\Delta Hh$ is generally about 10 J/g. The heat of fusion $\Delta Hh$ of 6 J/g or more is also important in order to prevent the PP beads from excessively expanding when filled in a skin in a softened state that is just produced by blow molding.

In the DSC curve, a difference $\Delta Tp$ in peak top temperature between the intrinsic endothermic peak and the neighboring high temperature endothermic peak is preferably 13° C. or more, more preferably 15° C. or more. The upper limit of the difference $\Delta Tp$ is about 20° C. When there are two or more intrinsic endothermic peaks and two or more high temperature endothermic peaks, the difference $\Delta Tp$ is between the peak top temperature of the intrinsic endothermic peak having the highest peak top temperature and the peak top temperature of the high temperature endothermic peak having the lowest peak top temperature.

Figure 3:
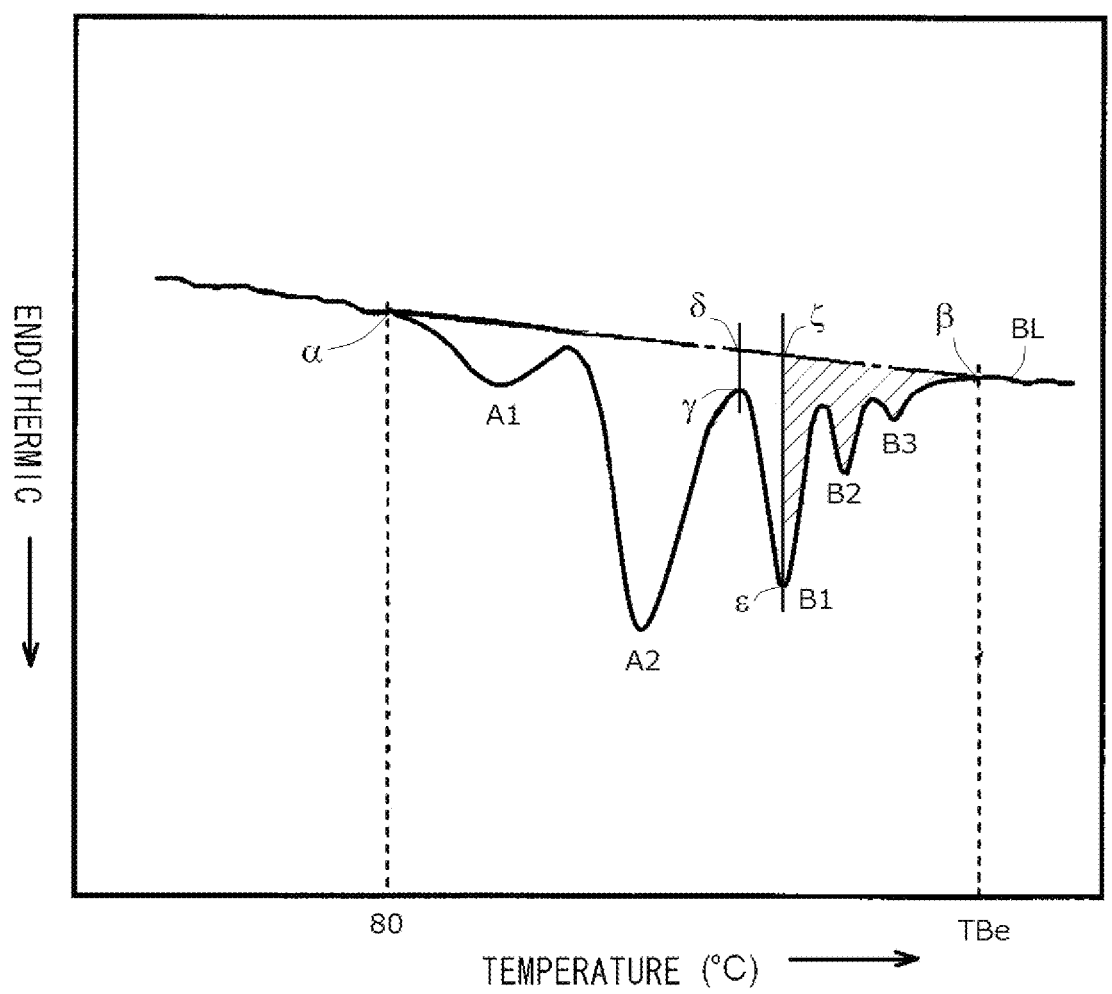
FIG. 3 illustrates an example of a first heating run DSC curve of polypropylene-based resin expanded beads as measured with a heat flux differential scanning calorimeter.

As used herein, the DSC curve is measured by a measuring method according to JIS K7122 (1987) as follows. A measurement specimen of the PP bead(s) (2 to 10 mg) is sampled and heated using a differential scanning calorimeter from 23° C. to 200° C. at a heating rate of 10° C./minute to obtain a DSC curve (first heating run DSC curve) an example of which is shown in FIG. 3. In the illustrated example shown in FIG. 3, the DSC curve has two intrinsic endothermic peaks A1 and A2 and three high temperature endothermic peaks B1, B2 and B3.

From the DSC curve, the total heat of fusion $\Delta Ht$ (total endothermic calorific value) of the entire intrinsic endothermic peaks, the heat of fusion $\Delta H2$ of the high temperature peak(s) and the heat of fusion $\Delta Hh$ of the specific portion of the high temperature peak(s) are determined as follows. First, as shown in FIG. 3, a straight line connecting a point α on the DSC curve at 80° C. and a point β on the DSC curve at a melting termination temperature TBe of the PP beads is drawn. The melting termination temperature TBe is a temperature of an intersection at which the DSC curve on a high temperature side of the highest temperature peak (B3), which has the highest peak top temperature among peak top temperatures of the three high temperature peaks (B1, B2 and B3), meets the base line BL.

Next, a line which is parallel with the ordinate and which passes a point γ on the DSC curve at the bottom of the valley between the intrinsic endothermic peak A2 and the neighboring high temperature endothermic peak B1 is drawn. This line crosses the line segment αβ at a point δ. The intrinsic endothermic peak A2 has the highest peak top temperature among the peak top temperatures of the intrinsic endothermic peaks (A1 and A2), while the high temperature endothermic peak B1 has the lowest peak top temperature among the peak top temperatures of the high temperature peaks (B1, B2 and B3). Further, a line which is parallel with the ordinate and which passes a point ε of the peak top of the lowest high temperature peak B1 is drawn. This line crosses the line segment αβ at a point ζ. The lowest high temperature peak B1 is that high temperature endothermic peak which has the lowest peak top temperature among the peak top temperatures of the three high temperature peaks (B1, B2 and B3).

The total heat of fusion $\Delta H2$ of the high temperature endothermic peaks (B1, B2 and B3) is a heat of fusion of the area bounded by the DSC curve of the three high temperature peaks (B1, B2 and B3), the line segment αβ and the line segment γδ. The total heat of fusion $\Delta Ht$ of the entire endothermic peaks (peaks A1, A2, B1, B2 and B3) is a heat of fusion of the area bounded by the DSC curve and the line segment αβ. The heat of fusion ΔHh of the specific portion of the high temperature peak(s) is a heat of fusion of the area (shaded area) bound by the line segment αβ, the line segment εζ and the DSC curve on a high temperature side of the peak top temperature of the lowest temperature peak (B1) which has the lowest peak top temperature among those of the high temperature peaks (B1, B2 and B3).

The high temperature peak(s) may appear in a first heating run DSC curve obtained when a measurement specimen of PP beads is heated from 23° C. to 200° C. at a heating rate of 10° C./minute by differential scanning calorimetry, but does not appear in a second heating run DSC curve obtained by cooling the measurement specimen after the first heating run from 200° C. to 40° C. at a cooling rate of 10° C./minute and then again heated to 200° C. at a heating rate of 10° C./minute. Therefore, whether or not there is a high temperature endothermic peak in a first heating run DSC curve of a given PP beads sample may be easily determined by continuing the DSC measurement to obtain a second heating run DSC curve of the sample. Namely, the endothermic peak(s) which appears in the first heating run DSC curve but does not exist in the second heating run DSC curve, is (are) regarded as high temperature peak(s).

The PP beads are prepared using a polypropylene-based resin as a raw material. The polypropylene-based resin used for preparing the PP beads is preferably a resin containing 50% by weight or more of propylene component units and may be propylene homopolymers and propylene copolymers. Those propylene copolymers exemplified above in connection with the thermoplastic resin for preparing the skin may be also preferably used for preparing the PP beads.

It is important that the polypropylene-based resin used for preparing the PP beads must have a melting point Tm of 140 to 155° C. Too high a melting point of the polypropylene-based resin over 155° C. is not preferable because it is necessary to increase the pressure of the steam used for fusion-bond the PP beads. Too low a melting point less than 140° C. is not desirable because the mechanical strength of the PP beads is lowered. Ethylene-propylene random copolymers, propylene-butene random copolymers and propylene-ethylene-butene random copolymers are preferred examples of the polypropylene-based resin having a melting point Tm of 140 to 155° C.

The melting point Tm and melting completion temperature Te (hereinafter described) as used herein are as measured by differential scanning calorimetry according to JIS K7121 (1987). More particularly, the melting point Tm and melting completion temperature Te are measured after the measurement sample has been subjected to a specified heat treatment according to "3. Conditioning of Test Samples (2) of JIS K7121 (1987)" (the cooling rate is 10° C./minute). The resulting sample is heated with a DSC device at a heating rate of 10° C./minute for measuring a DSC curve. The peak top temperature of an endothermic fusion peak is the melting point Tm. When a plurality of endothermic peaks are present in the DSC curve, the peak temperature of the endothermic peak that has the largest area represents the melting point Tm. The extrapolated melting completion temperature determined from the DSC curve is the melting completion temperature Te of the measurement sample. The measurement sample for measuring the melting point Tm and the melt completion temperature Te is sampled from the raw material polypropylene-based resin used for preparing the PP beads.

It is preferred that the polypropylene-based resin used for preparing the PP beads has a flexural modulus of at least 700 MPa, more preferably at least 800 MPa, for reasons that the PP beads show appropriate secondary expansion property and can give an expanded bead molded article having good rigidity. The upper limit of the flexural modulus is generally about 1,200 MPa. The flexural modulus is measured according to the method specified in JIS K7171 (1994). A resin test piece having a thickness of 2 mm, a width of 25 mm and a length of 40 mm is prepared and measured for its flexural modulus under conditions involving a span between fulcrums of 30 mm, an indenter radius of $R_1$ of 5.0 mm, a fulcrum radius of $R_2$ of 2.0 mm, and a test speed of 2 mm/min. The above measurement is repeated five times in total and an average of the five measured values is defined as the flexural modulus of the resin.

The PP beads used in the method of the present invention may be preferably prepared by a dispersing medium release foaming method which permits an easy control of the formation of high temperature endothermic peak(s) and heat of fusion (endothermic calorific value) thereof. In the dispersing medium releasing foaming method, polypropylene-based resin particles or pellets are dispersed in a dispersing medium, such as water, contained in a closed vessel together with a physical blowing agent. The dispersing medium is then heated to impregnate the resin particles with the blowing agent and to obtain blowing agent-impregnated expandable resin particles (blowing agent impregnation step). Then, the expandable resin particles in a softened state are released, together with the dispersing medium, from the closed vessel which is maintained in a high pressure condition to an atmosphere which is maintained at a pressure lower than that in the closed vessel to foam and expand the resin particles (foaming step), thereby obtaining PP beads.

The polypropylene-based resin particles may be prepared as follows. A polypropylene-based resin and, if needed, additives are fed to an extruder and melted and kneaded. The molten kneaded mass thus obtained is extruded in the form of strands through small holes of a die at a tip of the extruder. The extruded strands are cooled by being immersed in water and then cut with a pelletizer such that the resin particles obtained each have a specific weight, whereby resin particles are obtained. Alternatively, such resin particles may be obtained by cutting the extruded strands in water into resin particles each have a specific weight in such a manner that the resin particles are cooled with water simultaneous with the cutting.

The resin particles preferably have an average weight per one particle of 0.2 to 1.5 mg. The shape of the resin particles may be, for example, a cylindrical column, a sphere, a rectangular column or an oval sphere. Expanded beads obtained by foaming and expanding the resin particles have a shape that is similar to that of the resin particles before expansion.

Description will be next made of the blowing agent impregnation step and foaming step of the dispersing medium release foaming method. In one embodiment of the dispersing medium release foaming method, the resin particles are impregnated with a physical blowing agent to form expandable resin particles, for example, by heating, in a pressure resisting vessel such as autoclave, the resin particles dispersed in a dispersing medium together with a physical blowing agent, or by first dispersing and heating the resin particles in a dispersing medium in a pressure resisting vessel, a blowing agent being subsequently injected into the pressure resisting vessel (blowing agent impregnation step). The obtained expandable resin particles in a molten state are then released together with the dispersing medium to a zone having a lower temperature and lower pressure than those in the pressure resisting vessel so that the expandable resin particles are allowed to foam and expand (foaming step) to obtain the PP beads. During the release of the expandable resin particles, a back pressure is preferably applied to the pressure resisting vessel to keep the pressure inside the pressure resisting vessel high.

Any desired additive may be previously incorporated into the resin particles. For example, a cell controlling agent may be suitably added for the purpose of controlling the apparent density and cell diameter of the obtained PP beads. Examples of the cell controlling agent include an inorganic powder such as talc, calcium carbonate, borax, zinc borate, aluminum hydroxide and silica, and a polymer such as polytetrafluoroethylene, polyethylene wax, polycarbonate and cross-linked polystyrene. The cell controlling agent is preferably used in an amount of 0.001 to 5 parts by weight, more preferably 0.005 to 3 parts by weight, still more preferably 0.01 to 2 parts by weight, based on 100 parts by weight of the polypropylene-based resin.

The blowing agent used in the dispersing medium release foaming method is generally an organic physical blowing agent, an inorganic physical blowing agent or a mixture thereof. Examples of the organic blowing agent include aliphatic hydrocarbons such as propane, butane, pentane, hexane and heptane; alicyclic hydrocarbons such as cyclobutane, cyclopentane and cyclohexane; and halogenated hydrocarbons such as chlorofluoromethane, trifluoromethane, 1,1-difluoroethane, 1,2,2,2-tetrafluoroethane, methyl chloride, ethyl chloride and methylene chloride. These organic blowing agents may be used singly or in combination of two or more thereof. Examples of the inorganic physical blowing agent include nitrogen, carbon dioxide, argon and air. These inorganic physical blowing agents may be used singly or in combination of two or more thereof. Further, the above organic and inorganic physical blowing agents may be used in any desired combination. For reasons of freedom of ozone layer destruction and low costs, the use of inorganic physical blowing agent, especially nitrogen, air and carbon dioxide is preferred.

The amount of the physical blowing agent is determined as appropriate in consideration of the apparent density of the aimed PP beads, the kind of the polypropylene-based resin used as a base resin of the PP beads, the kind of the blowing agent, etc. In general, based on 100 parts by weight of the resin particles, the organic physical blowing agent is used in an amount of about 5 to 50 parts by weight while the inorganic physical blowing agent is used in an amount of about 0.5 to 30 parts by weight.

Water is generally used as the dispersing medium for dispersing the resin particles therein. A dispersing agent may be added to the dispersing medium, if necessary. Examples of the dispersing agent include aluminum oxide, titanium oxide, basic magnesium carbonate, basic zinc carbonate, calcium carbonate, kaolin, mica and clay. The dispersing agent may be used in an amount of 0.2 to 2 parts by weight based on 100 parts by weight of the resin particles.

As described above, the PP beads used in the method of the invention should show specific DSC characteristics involving (i) a specific $\Delta H2/\Delta Ht$ ratio of the total heat of fusion $\Delta H2$ of the high temperature peak(s) to the total heat of fusion $\Delta Ht$ and (ii) a specific heat of fusion $\Delta Hh$ of the specific portion of the high temperature peak(s).

In a preferred embodiment of the present invention, the high temperature peak(s) of the PP beads may be formed by the above-described dispersion medium release forming method as follows. Namely, polypropylene-based resin particles are dispersed and heated in a dispersing medium at a temperature not exceeding the melting completion temperature Te of the polypropylene-based resin that constitutes the resin particles to melt the polypropylene-based resin crystals. The heated dispersion is then held at a treating temperature Ta between a temperature lower by 20° C. than the melting point Tm of the polypropylene-based resin and a temperature lower than the melting completion temperature Te of the polypropylene-based resin (($Tm-20°$ C.)$\leq Ta<Te$) for a period of time sufficient to recrystallize the molten polypropylene-based resin crystals, preferably 1 to 60 minutes. If desired, the treating temperature Ta may be stepwisely or continuously increased at a suitable speed within the above range (between (Tm-20) and Te). The above-described treatment at the temperature Ta for the formation of high temperature peak(s) may be preceded by, followed by or concurrent with the blowing agent impregnation step. It is, however, preferable to carry out the heat treatment in a state where the resin particles are impregnated with the blowing agent.

After the above-described treatment for the formation of high temperature peak(s) has been completed, the dispersion containing the softened, blowing agent-containing expandable resin particles is heated to a foaming temperature Tb and discharged from the pressure resisting vessel maintained at a high pressure to a lower pressure environment to foam and expand the resin particles and to obtain the aimed PP beads.

The heat of fusion $\Delta Ht$ of the high temperature peak(s) of the PP beads varies depending upon the kind of the polypropylene-based resin used for preparing the PP beads, the treating temperature Ta, the holding time at the treating temperature Ta, the foaming temperature Tb, etc. For example, the heat of fusion of the high temperature peak(s) increases with an increase of the holding time at the treating temperature Ta. Further, the higher the foaming temperature Tb, the lower becomes the heat of fusion $\Delta Ht$ of the high temperature peak(s). The higher the treating temperature Ta, the lower becomes the peak top temperature of the high temperature peak(s), and the lower the treating temperature Ta, the higher becomes the peak top temperature of the high temperature peak(s). By conducting several preliminary tests while considering the above points, the production conditions for obtaining the PP beads with the desired heat of fusion $\Delta Ht$ of the high temperature peak(s) may be determined. The above-described temperature ranges of the treating temperature Ta and foaming temperature Tb are appropriate when the blowing agent is an inorganic physical blowing agent. When the blowing agent used is an organic physical blowing agent or a mixture of inorganic and organic physical blowing agents, the temperature ranges of Ta and Tb are lower by about 0 to about 30° C. than the above-described temperature ranges.

In order to suitably adjust the $\Delta H2/\Delta Ht$ ratio and the heat of fusion $\Delta Hh$ of the specific portion of the high temperature peak(s) in the above ranges, it is preferred that the treating temperature Ta is between the melting point Tm minus 15° C. and the melting point Tm plus 15° C. (($Tm-15°$ C.) Ta (Tm+15° C.)) and the holding time at the treating temperature Ta is 10 to 20 minutes.

Described below is a method for producing skin-covered, expanded bead molded article in which the skin (thermoplastic resin molded article having a hollow interior space) is prepared by blow molding. It should be noted, however, the skin may be prepared without resorting to use of blow molding.

A thermoplastic resin is extruded from a die attached to an extruder to form a tubular parison in a softened state. The parison is placed between split mold halves located just beneath the die. The mold halves are then closed around the parison and air is introduced into the parison to conform it to the shape of the mold cavity defined by the mold halves, thereby obtaining a skin defining a hollow space therein. A supply port for filling PP beads into the hollow space therethrough is formed in the skin and a plurality of heating medium feeding pins (preferably heating medium feeding and discharging pins each provided with a plurality of gas inlet/outlet ports) are inserted through the skin into the interior space thereof. Then, PP beads are fed to and filled in the space of the skin through the supply port while discharging the inside air through the heating medium feeding and discharging pins. A heating medium such as steam is fed into and discharged from the skin through the heating medium feeding and discharging pins to heat and fuse-bond the PP beads together and to form a PP bead molded article covered with the skin. The mold halves are opened to take the thus produced skin-covered, expanded bead molded article out of them. Each of the pins is usable for feeding or discharging the heating medium to or from the hollow space of the skin.

The PP beads may be filled in the hollow space of the skin by a so-called compression filling method. In this method, the hollow space of the skin is pressurized to a predetermined pressure, preferably a pressure in the range of 0.10 to 0.25 MPa(G). The PP beads, whose inside pressure has been increased to a level higher than that in the hollow space, are then supplied to and filled in the hollow space of the skin.

A method of forming the expanded bead molded article within the skin using steam as the heating medium will be described below. PP beads filled in the hollow space of the skin are heated with steam which is introduced thereinto and discharged therefrom through a plurality of heating medium feeding/discharging pins (hereinafter referred to simply as steam pins). The steam pins are generally divided into two first and second groups each including the same number of steam pins. When steam is fed to the steam pins of one of the two groups, the steam pins of the other group are opened to the air or connected to an evacuation device. The heating of the PP beads with steam may be carried out by a one-direction flow heating method, in which steam is fed into the skin only through the first group of steam pins and discharged from the skin only through the second group of steam pins. The heating of the PP beads with steam may be also carried out by an alternate flow heating method in which, in a first period of heating, steam is supplied to the first group of steam pins while discharging the steam through the second group of steam pins and, in the next period of heating, steam is supplied to the second group while discharging steam from the first group. Such a flow reversal may be repeated one or more times as desired. In order to evenly heat the PP beads contained in the skin, the alternate flow heating method is preferred.

High pressure steam is fed to a steam chamber where the steam pressure is reduced and adjusted to a desired value. The steam having the desired pressure is supplied from the steam chamber into the hollow space of the skin through the steam pins.

In the in-mold molding of the PP beads within the skin, the pressure of the steam in the steam chamber is preferably adjusted to 0.25 to 0.55 MPa(G) (gauge pressure), more preferably 0.30 to 0.52 MPa(G).

The positions and directions of the steam pins inserted into the skin are not specifically limited but are preferably determined in view of the shape of the skin such that the PP beads within the skin are evenly heated with steam introduced through the steam pins. If it is desired, from the standpoint of appearance, to minimize the presence of the traces of holes formed as a result of insertion of the steam pins through the skin, the steam pins are inserted through the skin in as small a number of directions as possible, preferably in one or two directions.

Figure 1D:
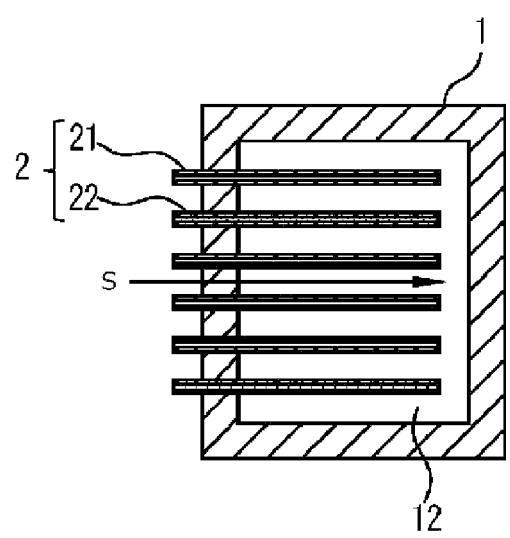
FIG. 1(d) is a sectional view taken along the line A-A in FIG. 1(a)
Figure 2A:
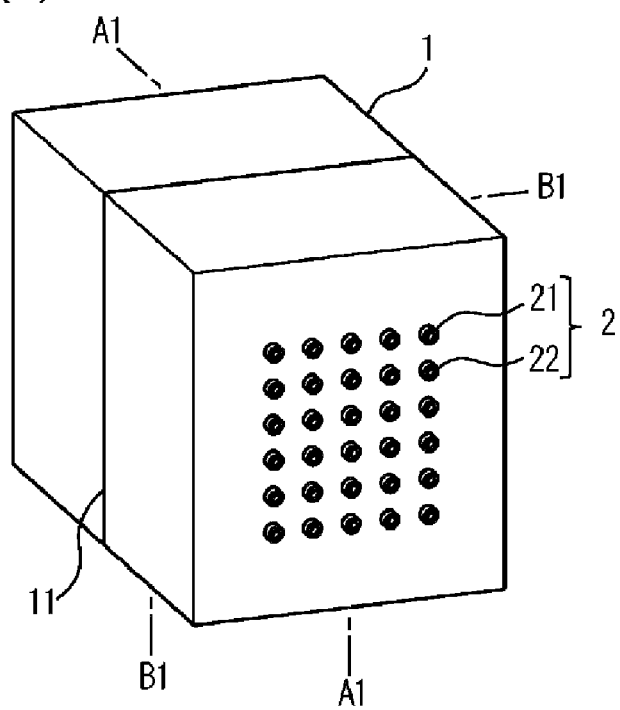
FIG. 2(a) is a perspective view schematically illustrating another embodiment of steam pin arrangement relative mold halves that are brought together.
Figure 2B:
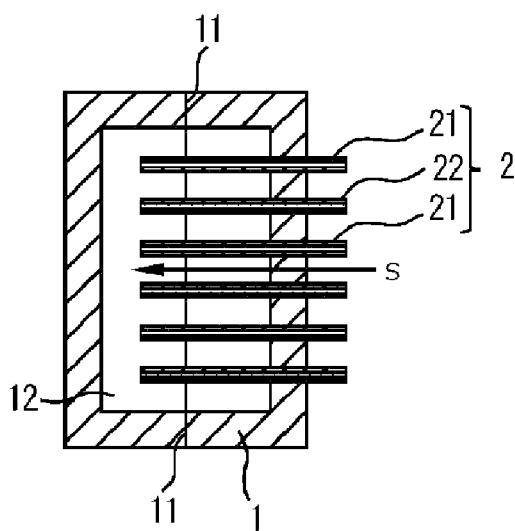
FIG. 2(b) is a sectional view taken along the line A1-A1 in FIG. 2(a)

FIG. 1(a) to FIG. 1(d) and FIG. 2(a) to FIG. 2(c) schematically depict examples of the arrangement of steam pins. In these Figures, designated as 1 is a mold having mold halves that are abutted at a parting line 11 to define a mold cavity 12. A plurality of steam pins 2 are inserted into the skin in the same direction as best seen in FIG. 1(d) and FIG. 2(b) from one side of the mold 1 (a side which includes the parting line 11 in the case of FIG. 1(a) and a side which does not include the parting line 11 in the case of FIG. 2(a)). The insertion direction S of the steam pins 2 is not limited to the one direction as in the illustrated embodiments and may be, for example, two directions (opposing directions), if desired.

The steam pins 2 include a first group of steam pins (three steam pins 21 in the case of FIG. 1(a) and fifteen steam pins 21 in the case of FIG. 2(a)) and a second group of steam pins (three steam pins 22 in the case of FIG. 1(a) and fifteen steam pins 22 in the case of FIG. 2(a)).

Figure 2C:
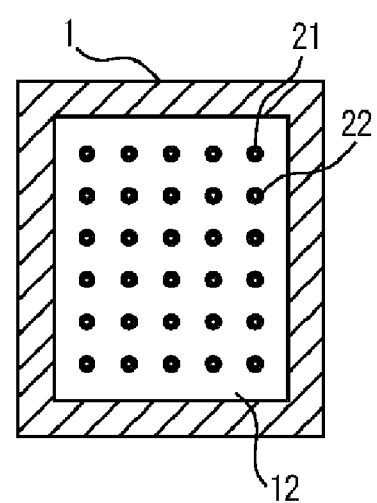
FIG. 2(c) is a sectional view taken along the line B1-B1 in FIG. 2(a)

In the embodiment of FIG. 1(a) to FIG. 1(d), the six steam pins 2 are arrayed in a single line with adjacent steam pins 21 and 22 belonging to different groups. In the embodiment of FIG. 2(a) to FIG. 2(c), the steam pins 2 are arranged in five parallel columns in the lengthwise direction of the mold cavity and six parallel rows in the widthwise direction of the mold cavity with each column consisting of six equally spaced apart steam pins. The thirty steam pins are arranged in such a way that five steam pins in each row belong to the same group while adjacent two steam pins 21 and 22 in each column belong to the different groups. It is without saying that the arrangement of the steam pins is not limited to the above. For example, the thirty steam pins may be arranged in such a way that six steam pins in each column belong to the same group while adjacent two steam pins in each row belong to the different groups. Further, the steam pins may be arranged in such a way that adjacent steam pins in each row and adjacent steam pins in each column belong to the different groups, so that the steam pins in the same group are arranged in a staggered pattern.

Steam inlet/outlet ports in each of the steam pins may be provided in any desired location and arrangement. For example such ports may be formed only in a periphery thereof when the steam pins are inserted through the skin in the same direction. When the steam pins are inserted from two opposite directions, the steam inlet/outlet ports may be formed not only in peripheral portions thereof but also in distal tip ends thereof.

In order to minimize variation of fusion bonding between PP beads of the expanded bead molded article, it is preferred that each of the steam pins for use in feeding steam is spaced apart a distance (pitch) of 400 mm or less from its adjacent steam pin for use in discharging steam.

As the pitch becomes smaller, however, the number of the undesirable traces of holes formed as a result of insertion of the steam pins through the skin generally increases. This results in deterioration of the mechanical strength of the expanded bead molded article. For this reason, the pitch between the steam pin for use in feeding steam and the steam pin for use in discharging steam is preferably 200 mm or more.

The expanded bead molded article preferably has an apparent density of 30 to 90 kg/m$^3$, more preferably 30 to 60 kg/m³, from the standpoint of balance between the lightness in weight and the mechanical strength of the expanded bead molded article.

The apparent density of the expanded bead molded article is calculated by dividing the weight of thereof by the volume thereof that is determined from the outer dimensions thereof.

The PP beads preferably has a bulk density of 20 to 60 kg/m³, more preferably 20 to 50 kg/m³, for reasons of achievement of the above-mentioned preferred apparent density of the expanded bead molded article.

As used herein, the bulk density (kg/m³) of the PP beads is measured by the following method. The PP beads are filled in an empty graduated cylinder up to the 1 L mark. The weight (g) of the expanded beads contained in the graduated cylinder is measured. From the measured weight (g) per 1 L of the PP beads, the bulk density (kg/m³) is calculated by simple unit conversion. The above measurement is repeated five times in total and an average of the five measured values is defined as the bulk density of the PP bead.

The following examples and comparative examples will further illustrate the present invention. It should be noted that the present invention is not limited to the examples.

PP Beads 1 to 11 were used in the examples and comparative examples. These PP beads were prepared as follows.

Preparation of Resin Particles:

Polypropylene-based resins used as the raw material for the preparation of PP Beads 1 to 11 were propylene-ethylene copolymers r-PP1 to r-PP5 having the ethylene component content shown in Table 1. Bending modulus, melting point $T_m$ and melting completion temperature $T_e$ of the propylene-ethylene copolymers r-PP1 to r-PP5 are also shown in Table 1. An extruder with an inside diameter of 50 mm provided with a die for forming strands was used as a device for forming resin particles. The polypropylene-based resin shown in Table 1 was fed to the extruder together with 1,000 ppm by weight of zinc borate powder as a cell controlling agent and kneaded with heating. The kneaded mass was extruded through the die into strands and cooled with water. The cooled strands were cut with a pelletizer into columnar resin particles (L/D=3.0) each having a mean weight of about 1.0 mg. In the resin particles for the preparation of PP Beads 1, 7 and 10 shown in Table 1, carbon black as a colorant was incorporated in an amount of 2.7 parts by weight based on 100 parts by weight of the polypropylene-based resin.

Preparation of PP Beads 1 to 11:

In a 5 L autoclave equipped with a stirrer, 1,000 g of the obtained resin particles were charged together with 3 L of water, 3 g of kaolin as a dispersing agent, and 0.04 g of sodium dodecyllbenzenesulfonate and 0.01 g of aluminum sulfate as a dispersing aid. Then, carbon dioxide (blowing agent) was fed to the autoclave so that an equilibrium vapor pressure shown in Table 1 was established. The dispersion in the autoclave was heated to a treating temperature Ta shown in Table 1 with stirring at a rate shown in Table 1. The dispersion was held at that temperature Ta for a holding time shown in Table 1. Thereafter, the dispersion was heated to a foaming temperature Tb shown in Table 1 and held at that temperature Tb for a holding time shown in Table 1. Then, the contents in the autoclave were discharged to the atmosphere to obtain PP Beads 1 to 11. The obtained PP Beads 1 to 11 had physical properties shown in Table 2.

TABLE 1

| | Polypropylene-Based Resin | | | | PP Beads Production Conditions | | | | | | |
|---|---|---|---|---|---|---|---|---|---|---|---|
| PP Beads | Kind (Ethylene content % by weight) | Bending modulus (MPa) | Tm (° C.) | Te (° C.) | Blowing agent | Vapor Pressure (MPa(G)) | Heating rate (° C./min) | Ta (° C.) | Holding time at Ta (min) | Tb (° C.) | Holding time at Tb (min) |
| 1 | r-PP1 (1.4) | 1,050 | 151.0 | 164.8 | CO₂ | 3.3 | 1.5 | 154 | 15 | 159 | 15 |
| 2 | r-PP1 (1.4) | 1,050 | 151.0 | 164.8 | CO₂ | 3.4 | 1.5 | 153 | 15 | 158 | 15 |
| 3 | r-PP2 (1.8) | 810 | 145.8 | 157.7 | CO₂ | 3.4 | 1.5 | 144 | 15 | 149 | 15 |
| 4 | r-PP3 (2.2) | 900 | 143.0 | 161.1 | CO₂ | 3.5 | 1.5 | 142 | 15 | 147 | 15 |
| 5 | r-PP4 (1.0) | 1,100 | 153.0 | 167.0 | CO₂ | 3.8 | 1.5 | 153 | 15 | 158 | 15 |
| 6 | r-PP1 (1.4) | 1,050 | 151.0 | 164.8 | CO₂ | 3.1 | 1.5 | 155 | 15 | 160 | 15 |
| 7 | r-PP2 (1.8) | 810 | 145.8 | 157.7 | CO₂ | 3.3 | 1.5 | 145 | 15 | 150 | 15 |
| 8 | r-PP3 (2.2) | 900 | 143.0 | 161.1 | CO₂ | 3.4 | 1.5 | 143 | 15 | 148 | 15 |
| 9 | r-PP5 (2.8) | 680 | 138.3 | 162.4 | CO₂ | 3.7 | 1.5 | 129 | 15 | 134 | 15 |
| 10 | r-PP2 (1.8) | 810 | 145.8 | 157.7 | CO₂ | 3.1 | 1.5 | 146 | 15 | 151 | 15 |
| 11 | r-PP1 (1.4) | 1,050 | 151.0 | 164.8 | CO₂ | 3.3 | 2.5 | — | — | 155 | 3 |

TABLE 2

| PP Beads | Bulk Density (kg/m³) | Average Particle Diameter (mm) | ΔHt (J/g) | ΔH2 (J/g) | ΔH2/ΔHt | ΔHh (J/g) | ΔTp (° C.) |
|---|---|---|---|---|---|---|---|
| 1 | 30 | 3.3 | 85.0 | 17.0 | 0.20 | 6.2 | 16.0 |
| 2 | 30 | 3.3 | 88.5 | 23.0 | 0.26 | 9.5 | 17.5 |
| 3 | 33 | 3.2 | 79.5 | 17.5 | 0.22 | 6.3 | 16.5 |
| 4 | 35 | 3.1 | 81.8 | 18.0 | 0.22 | 6.5 | 17.0 |
| 5 | 32 | 3.2 | 86.4 | 19.0 | 0.22 | 8.5 | 13.2 |
| 6 | 30 | 3.3 | 92.3 | 12.0 | 0.13 | 4.4 | 14.0 |
| 7 | 33 | 3.2 | 78.9 | 15.0 | 0.19 | 5.4 | 16.8 |
| 8 | 35 | 3.2 | 83.3 | 15.0 | 0.18 | 5.2 | 17.3 |
| 9 | 30 | 3.3 | 75.0 | 13.5 | 0.18 | 4.5 | 16.5 |
| 10 | 33 | 3.3 | 80.0 | 12.0 | 0.15 | 4.2 | 17.0 |
| 11 | 30 | 3.3 | 85.0 | 17.0 | 0.20 | 4.8 | 13.0 |

Examples 1 to 6 and Comparative Examples 1 to 8

A polypropylene resin shown in Table 3 was supplied to an extruder having an inside diameter of 65 mm, and heated and kneaded therein at 210° C. to prepare a melt of the resin. The melt was filled in an accumulator adjusted to 210° C. The melt in the accumulator was extruded through a die to obtain a tubular parison. The parison in a softened state was placed between split mold halves of a blow-molding device located just beneath the die. Then, the mold halves were closed. The temperature of the mold had been adjusted to 70° C. A blow pin was inserted through the parison and pressurized air with a pressure of 0.50 MPa(G) was then blown into the parison from the blow pin, while evacuating the space between the outer surface of the parison and the inner surface of the mold, whereby a hollow blow-molded product (skin defining a hollow interior space) conforming to the shape of the mold cavity and having an average wall thickness of 2.5 mm was obtained. The split mold halves were configured to define a nearly cuboid mold cavity having a length of 730 mm, a width of 420 mm and a thickness of 60 mm, when closed. The molding device was also equipped with a bead feeder (diameter: 15 mmφ) and six steam pins (diameter: 8 mmφ). The six steam pins were adapted to be inserted into the skin in the same direction from that side of the mold half which did not include the parting line (similar to FIG. 2(b)) and arranged in two columns spaced apart a distance (pitch) of 230 mm and three rows spaced apart a distance (pitch) of 300 mm. The six steam pins were divided into two first and second groups each containing three steam pins and arranged in such a way that adjacent steam pins in each row and adjacent steam pins in each column belong to the different groups. Thus, the three steam pins in the same group are arranged in a staggered pattern.

The six steam pins were inserted through the skin in a softened state from a side of one of the mold halves toward opposing side of the other mold half. Then the PP beads shown in Table 4 were fed through the filling feeder into the hollow space of the skin while maintaining the inside pressure of the hollow space at 0.18 MPa(G) by venting the air therefrom through the six steam pins.

After the PP beads had been filled in the skin, steam having a pressure shown in Table 4 was fed through the three steam pins of the same first group into the skin for 10 seconds while sucking the steam from the three steam pins of the other, second group. Then the steam flow direction was reversed by feeding steam through the steam pins of the second group into the skin for 10 seconds while sucking the steam through the steam pins of the first group. Thereafter, steam having a pressure shown in Table 4 was fed through all of the six steam pins for 8 seconds so that the PP beads were fusion-bonded together to form an expanded bead molded article which was also fusion-bonded to the interior surface of the skin. The molded product was then cooled until the pressure measured with a surface pressure sensor attached to the mold reached 0.05 MPa(G). After the steam pin had been removed, the mold halves were opened to obtain a skin-covered, expanded bead molded article. The steam pressure shown in Table 4 is the pressure in a steam chamber from which the steam is fed to the steam pin. Various physical properties of the obtained skin-covered, expanded bead molded article are shown in Table 5.

TABLE 3

| Abbreviation | Thermoplastic Resin | | Melting point (° C.) | Heat of Fusion (J/g) | MFR |
|---|---|---|---|---|---|
| | Kind | Maker, Product Name & Grade | | | |
| b-PP | Propylene-ethylene block copolymer | Prime Polymer Co., Ltd. PRIME POLYPRO E-150GK | 162.5 | 80.6 | 0.6 |
| HDPE | High density polyethylene | Tosoh Corporation NIPOLON HARD 6530 | 129.8 | 193.4 | 0.1 |

TABLE 4

| | Thermoplastic Resin of Skin | PP Beads | Steam Pressure (MPa(G)) | Molding Cycle time (sec) |
|---|---|---|---|---|
| Example 1 | b-PP | 1 | 0.46 | 220 |
| Example 2 | b-PP | 2 | 0.50 | 240 |
| Example 3 | b-PP | 3 | 0.44 | 200 |
| Example 4 | b-PP | 4 | 0.40 | 210 |
| Example 5 | b-PP | 5 | 0.52 | 210 |
| Example 6 | HDPE | 3 | 0.44 | 200 |
| Comparative Example 1 | b-PP | 6 | 0.40 | 250 |
| Comparative Example 2 | b-PP | 6 | 0.46 | 260 |
| Comparative Example 3 | b-PP | 7 | 0.40 | 240 |
| Comparative Example 4 | b-PP | 7 | 0.44 | 250 |
| Comparative Example 5 | b-PP | 8 | 0.35 | 240 |
| Comparative Example 6 | b-PP | 9 | 0.30 | 250 |
| Comparative Example 7 | b-PP | 10 | 0.40 | 240 |
| Comparative Example 8 | b-PP | 11 | 0.46 | 220 |

TABLE 5

| | Skin Thickness (mm) | Apparent Density (kg/m³) | Fusion Bonding Rate between Skin and PP Beads | Fusion Bonding Rate between PP Beads | | Shrinkage (%) |
|---|---|---|---|---|---|---|
| | | | | Central part (%) | Corner part (%) | |
| Example 1 | 2.5 | 38 | good | 60 | 50 | 1.8 |
| Example 2 | 2.5 | 34 | good | 60 | 50 | 1.8 |
| Example 3 | 2.5 | 41 | good | 70 | 55 | 1.6 |
| Example 4 | 2.5 | 39 | good | 50 | 35 | 1.7 |
| Example 5 | 2.5 | 43 | good | 60 | 45 | 1.8 |
| Example 6 | 2.5 | 41 | — | 70 | 55 | 1.6 |
| Comparative Example 1 | 2.5 | 41 | bad | 20 | 10 | 2.2 |
| Comparative Example 2 | 2.5 | 41 | bad | 30 | 10 | 2.3 |
| Comparative Example 3 | 2.5 | 39 | bad | 30 | 10 | 2.2 |
| Comparative Example 4 | 2.5 | 39 | bad | 30 | 10 | 2.3 |
| Comparative Example 5 | 2.5 | 40 | bad | 20 | 5 | 2.3 |
| Comparative Example 6 | 2.5 | 37 | bad | 10 | 0 | 2.6 |
| Comparative Example 7 | 2.5 | 41 | bad | 20 | 10 | 2.4 |
| Comparative Example 8 | 2.5 | 38 | good | 30 | 10 | 2.5 |

In Table 1, the bending modulus of the polypropylene-based resin used for preparing the PP beads was measured according to the method described previously.

In Table 2, the bulk density of the PP beads was measured according to the method described previously.

In Table 2, the average diameter of the PP beads is measured as follows. The maximum diameters of one hundred arbitrarily-selected PP beads were measured and the average of the measured values was defined as the average diameter of the PP beads.

In Tables 1 to 3, the various measured values by the DSC measurement were obtained by the methods described previously. Each of the above DSC measurement was repeated five times in total and an average of five measured values was shown in Tables 1 to 3.

In Table 3, the melt flow rate (MFR) of the thermoplastic resin was measured according to JIS K7210 (1999), method M (at 230° C. and a load of 2.16 kg) in the case of the polypropylene-based resin and method D (at 190° C. and a load of 2.16 kg) in the case of the polyethylene-based resin.

In Table 5, the apparent density of the expanded bead molded article was measured as follows. A test piece of an expanded bead molded article was cut out from the skin-covered, expanded bead molded article. The apparent density of the expanded bead molded article was obtained by dividing the weight (g) of the test piece by the volume (cm$^3$) thereof that was determined from its external dimensions.

In Table 4, the amount of time required from the start of closing the mold halves until the completion of releasing the skin-covered, expanded bead molded article from the molds is defined as the molding cycle time (seconds).

In Table 5, the fusion bonding rate between the PP beads of the skin-covered, expanded bead molded article at its central part and corner part was measured as follows. Five test pieces for the measurement of the fusion bonding rate were cut out at five portions (central part and four corner parts (except rounded part)) of the as obtained skin-covered, expanded bead molded article. Each of the test pieces was prepared in such a way that no skin was included therein and the size thereof was 50 mm×50 mm×(thickness of the skin-covered, expanded bead molded article except the skin). Each of the test pieces was broken into two halves, and the entire PP beads present in the broken surfaces were visually observed to count the number of broken PP beads (n1) and the number of PP beads separated along their interfaces (n2). The percentage of the number of the broken PP beads (n1) based on the sum (n1+n2) of the number of the broken PP beads and the number of PP beads separated along their interfaces was obtained for each of the five test pieces. The percentage value of the test piece obtained at the central part and the smallest percentage value among the percentage values of the four test pieces obtained at the four corner parts are shown in Table 4.

In Table 5, the fusion bonding rate between the skin and the expanded bead molded article was measured as follows. Five test pieces were cut out at five portions (central part and four corner parts (except rounded part)) of the as obtained skin-covered, expanded bead molded article in such a way that the size thereof was 50 mm×50 mm×(thickness of the skin-covered, expanded bead molded article including the skin). The skin of each test piece was peeled off and entire PP beads present in the peeled surface were visually observed to count the number of broken PP beads (N1) and the number of PP beads separated along an interface between the PP beads and the skin (N2). The percentage of the number of the broken PP beads (N1) based on the sum (N1+N2) of the number of broken PP beads and the number of PP beads separated along an interface between the PP beads and the skin was obtained for each test peace. The smallest percentage value among the percentage values of the five test pieces was defined as the adhesion rate between the skin and the PP beads. The adhesion strength was evaluated on the basis of the adhesion rate according to the following criteria.

Good: The adhesion rate is 50% or higher.
Bad: The adhesion rate is lower than 50%.

In Example 6, the fusion bonding rate was not measured because this example did not intend to obtain an improved bonding rate between the skin and the PP beads.

In Table 5, the shrinkage of the skin-covered, expanded bead molded article was measured as follows. The molded articles was measured for its length L2 (mm) in its thickness direction. The shrinkage (%) of the molded article was then calculated from the formula:

Shrinkage (%)=100×(L1−L2)/L1 wherein L1 is 60 mm (thickness of the molded cavity).

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein. The teachings of Japanese Patent Applications No. 2014-147673 filed Jul. 18, 2014 and No. 2015-121841 filed Jun. 17, 2015, inclusive of the specification, claims and drawings, are hereby incorporated by reference herein.

What is claimed is:

1. A method for producing a skin-covered, expanded bead molded article comprising the steps of:
providing a skin of a thermoplastic resin molded article defining a hollow space therewithin;
filling polypropylene-based resin expanded beads in the hollow space; and
then feeding a heating medium into the hollow space through one or more heating medium feeding pins inserted into the hollow space to fusion-bond the expanded beads to each other and to form an expanded bead molded article that is covered with the skin;
wherein the polypropylene-based resin expanded beads are prepared from a polypropylene-based resin which has a melting point of 140 to 155° C. and which is selected from the group consisting of ethylene-propylene random copolymers, propylene-butene random copolymers, and propylene-ethylene-butene random copolymers,
wherein the polypropylene-based resin expanded beads have such a crystal structure that gives a first DSC curve obtained when a measurement specimen sampled from the polypropylene-based resin expanded beads is heated from 23° C. to 200° C. at a heating speed of 10° C./min and a second DSC curve obtained when the measurement specimen remaining after the measurement of the first DSC curve is cooled from 200° C. to 40° C. at a cooling rate of 10° C./minute and then again heated to 200° C. at a heating rate of 10° C./minute,
said first DSC curve having an intrinsic endothermic peak intrinsic to the polypropylene-based resin constituting the polypropylene-based resin expanded beads and at least one high temperature endothermic peak which is located on a higher temperature side of the intrinsic endothermic peak,
said at least one high temperature endothermic peak does not appear in the second DSC curve,
wherein a total heat of fusion ΔHt of the entire endothermic peaks of the DSC curve is more than 75 J/g,
a ratio ΔH2/ΔHt of a total heat of fusion ΔH2 of said at least one high temperature endothermic peak to the total heat of fusion ΔHt is 0.20 to 0.30, wherein the heat of fusion ΔH2 is greater than 15 J/g and not greater than 23 J/g, and
a heat of fusion ΔHh of that portion of said at least one high temperature endothermic peak which is higher than the peak top temperature of a lowest temperature peak is 6 J/g or more and 10 J/g or less, said lowest temperature peak being that high temperature endothermic peak which has the lowest peak top temperature among the peak top temperatures of said at least one high temperature endothermic peak with the proviso that when there is only one high temperature endothermic peak in said DSC curve, the peak top temperature of the only one high temperature endothermic peak is said lowest temperature peak.

2. The method according to claim 1, wherein the thermoplastic resin molded article is obtained by blow molding and wherein the polypropylene-based resin expanded beads are filled in the hollow space of the thermoplastic resin molded article while the thermoplastic resin molded article is in a softened state.

3. The method according to claim 1, wherein the polypropylene-based resin expanded beads have a bulk density of 20 to 60 kg/m³.

4. The method according to claim 1, wherein the thermoplastic resin molded article is formed of a polypropylene-based resin.

5. The method according to claim 1, wherein a difference $\Delta Tp$ in peak top temperature between the intrinsic endothermic peak and a neighboring high temperature endothermic peak is 15° C. or more.

6. The method according to claim 1, wherein said DSC curve has only one high temperature peak and that said lowest temperature peak is said only one high temperature peak.

7. The method according to claim 1, wherein the $\Delta Ht$ of the entire endothermic peaks is not more than 120 J/g.

8. The method according to claim 1, wherein said feeding of the heating medium into the hollow space is carried out using two first and second groups of steam pins in such a manner that the heating medium is first fed into the hollow space through the first group of steam pins while sucking the heating medium from the second group of steam pins, the heating medium being next fed through the second group of steam pins while sucking the heating medium through the first group of steam pins, and, thereafter, fed through both first and second groups of steam pins, and wherein each of the steam pins of the first group is spaced apart a distance of 200 to 400 mm from its adjacent steam pin of the second group.

* * * * *